(12) United States Patent
Lichtensteiger

(10) Patent No.: US 12,303,343 B2
(45) Date of Patent: May 20, 2025

(54) ROUND DENTAL BLANK HOLDING RING AND AN ARRANGEMENT HAVING A BLANK AND A HOLDING RING

(71) Applicant: Ivoclar Vivadent AG, Schaan (LI)

(72) Inventor: Markus Lichtensteiger, Montlingen (CH)

(73) Assignee: Ivoclar Vivadent AG, Schaan (LI)

( * ) Notice: Subject to any disclaimer, the term of this patent is extended or adjusted under 35 U.S.C. 154(b) by 148 days.

(21) Appl. No.: 17/519,663

(22) Filed: Nov. 5, 2021

(65) Prior Publication Data
US 2022/0142756 A1 May 12, 2022

(30) Foreign Application Priority Data
Nov. 6, 2020 (EP) .................... 20206312

(51) Int. Cl.
*A61C 13/00* (2006.01)
*A61C 13/12* (2006.01)
*B23Q 3/06* (2006.01)
*B25B 11/00* (2006.01)

(52) U.S. Cl.
CPC ...... *A61C 13/0022* (2013.01); *A61C 13/0006* (2013.01); *B23Q 3/062* (2013.01); *A61C 13/12* (2013.01); *B25B 11/00* (2013.01)

(58) Field of Classification Search
CPC ........... B25B 13/04; B25B 5/163; B25B 1/20; B25B 1/2405; B25B 11/00; A61C 13/0022; A61C 13/0004; A61C 13/12; A61C 8/05089; A61C 5/82; B23Q 3/062; F16J 15/3488
USPC .......................................... 269/287
See application file for complete search history.

(56) References Cited

U.S. PATENT DOCUMENTS

| | | |
|---|---|---|
| 7,604,759 B2 | 10/2009 | Gubler et al. |
| 2017/0065381 A1* | 3/2017 | Schuetz ............. A61C 13/0006 |
| 2017/0333168 A9 | 11/2017 | Schuetz |
| 2018/0055612 A1* | 3/2018 | Kadobayashi ..... A61C 13/0004 |
| 2018/0236620 A1 | 8/2018 | Schüle et al. |
| 2019/0046305 A1* | 2/2019 | Gebhardt ................. B23Q 3/18 |

FOREIGN PATENT DOCUMENTS

DE 202013103515 U1 9/2013
DE 202017006526 U1 6/2018

* cited by examiner

*Primary Examiner* — Edward F Landrum
*Assistant Examiner* — Sidney D Full
(74) *Attorney, Agent, or Firm* — Ann M. Knab; Thad McMurray

(57) ABSTRACT

The invention relates to a round dental blank holding ring, in particular having a holding projection (22) forming an undercut, wherein the holding ring (10) consists of at least two components (26, 28), the harder one of which overlaps the softer one.

16 Claims, 7 Drawing Sheets

ROUND DENTAL BLANK HOLDING RING AND AN ARRANGEMENT HAVING A BLANK AND A HOLDING RING

CROSS-REFERENCE TO RELATED APPLICATIONS

This application claims priority to European Patent Application No. 20206312.9 filed on Nov. 6, 2020, the disclosure of which is incorporated herein by reference in its entirety.

TECHNICAL FIELD

The invention relates to a round dental blank holding ring and to a round dental blank holding ring with a round dental blank.

BACKGROUND

Round dental blank holding rings and associated round dental blanks of this type have been known for a long time. Round dental blanks are typically in the form of a flat cylinder or disc shape and are fabricated of millable material suitable for the production of dental restoration parts.

The provision of such a blank with a holding edge which was circumferential and served for mounting on a milling holder has also been proposed. A holding edge of this type could be attached by means of a dental adhesive. A blank of this type was suitable for the production of only a single dental restoration part.

However, blanks in the form of so-called round dental blanks have been known for decades, the blank in these cases being substantially disc-shaped and having a diameter of about 10 cm so that numerous dental restoration parts can be produced from such a round blank.

It is milled from the solid material and the individual dental restoration parts remain connected to the blank body of the round dental blank by holding webs. The fully milled dental restoration parts are broken out of a skeleton-like semi-finished product and the breaking points of the holding webs are cleaned up.

In order to ensure the best possible use of material in the round dental blank it is attempted, on the one hand, to optimise the arrangement of the different formed dental restoration parts on the round dental blank in a virtual manner beforehand, i.e. in advance. On the other hand, the aim is to mill as close to the edge as possible. However, there are limits to milling near the edge owing to the need for the remaining edge to remain stable against the milling forces which arise. At this location there must be a sufficient safety margin as, in the event of a breakage, all of the dental restoration parts to be produced are typically waste.

At least some of the materials used for dental blanks, including round dental blanks, are extremely expensive. Millable materials also include, in addition to comparatively inexpensive wax or PMMA, materials such as $ZrO_2$, titanium or Ko—Cr.

While a stuck-on ring edge can lead to savings with respect to the quantity of dental materials, the ring edge is currently typically formed in one piece as a unitary construction. This has the definite advantage that the round dental blank is somewhat additionally stabilised at the edge so that it is possible to mill closer towards the edge.

Round dental blanks which have been known for some time have the disadvantage that a comparatively wide non-millable edge must remain so as not to impair the stability of the blank during milling.

U.S. Pat. Nos. 7,604,759, 20170333168, 20170065381, and 20180055612 are directed to mill blanks and are herein incorporated by reference in their entirety.

SUMMARY

In contrast, the object of the invention is to produce a round dental blank holding ring according to the claims and a round dental blank with a round dental blank holding ring according to the claims, which permit improved use of the available material of the dental restoration without increased risk of breakage of the round dental blank gripped during milling.

In accordance with the invention, this object is achieved by the independent claims. Advantageous developments are apparent from the dependent claims.

In accordance with the invention, provision is made for elastically mounting the round dental blank in a round dental blank holding ring. The shaking and stresses on the comparatively brittle ceramic material of the round dental blank which are introduced by the milling machine are gently absorbed by the softer mounting material. This unexpectedly leads to milling being possible even with a smaller remaining free edge, i.e. an edge where no milling takes place.

It is fair to assume that the risk of breakage increases drastically owing to the severe vibrations introduced by the rotating milling tool into the brittle ceramic material of the round dental blank. In contrast, the solution in accordance with the invention attempts to even out and to smooth the stress peaks introduced and so, considered over the time integral, no greater or lesser application of stress is present.

Rather, this is influenced such that the vibrations are damped at their stress peaks. This leads to the greatest stress peaks which are introduced into the remaining stabilizing edge, also called the clear margin, of the semi-milled round dental blank being ground down, so to speak.

By means of the holding ring in accordance with the invention, the round dental blank is additionally held under pre-stressing, i.e. under pressure.

However, investigations carried out in conjunction with the invention have shown that the tendency of the round dental blank to break as a semi-finished product is reduced with the design in accordance with the invention.

It is particularly favourable for the holding ring to be formed with a C-shaped cross-section and the softer material of the holding ring or the softer component of the holding ring to surround and clamp the round dental blank not only in the circumferential direction but also on the disc surfaces. For this purpose, the C-shaped profile comprises the softer component on the inner side of the C.

It is particularly advantageous that the holding ring, which is either C-shaped or L-shaped, automatically provides a mounting aid so to speak, regardless of whether the holding ring is in one part or two parts.

When the holding ring is of a C shape in two parts, the lower part also forms, so to speak, an L, and the round blank can then be placed into this part so that it forms a mounting aid in forming a stop.

In both cases, the lower end limb forms a stop for setting the vertical position of the round dental blank when the contact between the round blank and the end limb is achieved. In this way, the vertical position of the round blank is fixed.

The insertion of the round blank into the holding ring or the fixing thereof can be carried out in a precisely positioned manner. The clamping of the holding ring on the milling holder and the contact between the holding ring and the round blank mean that the position is fixed precisely and this contributes to making better use of the expensive ceramic material of the round blank because the free edges of the round blank, i.e. the regions of the round blank which must remain non-milled for stability reasons, can be held as slightly as possible.

The softer component can be attached to the harder component of the holding ring in any suitable manner.

The holding ring is preferably first produced in full, i.e. produced from the softer component and the harder component.

Subsequently to this, the round dental blank is clamped on the holding ring, and in particular preferably so that the round dental blank is not just held loosely by being mounted on the holding ring but is fixed in a clamped manner.

In an advantageous embodiment of the invention, an annular holding projection is provided for clamping purposes, which extends radially outwardly on the holding ring and forms an undercut. This can be clamped and therefore fixed on the workpiece receiver of the milling machine, the chuck.

"Clamped" means herein that by means of the mounting arrangement, pre-stresses from the holding ring, in particular from the harder component thereof, are introduced into the round dental blank. This applies in particular to the radial direction of the round dental blank but also for the axis-parallel direction.

The round dental blank is preferably in the form of a flat cylinder, i.e. in the form of a circular disc. It is held in a clamped manner on the holding ring so that both radially inwardly directed forces from the holding ring towards the round dental blank and also axis-parallel forces with respect to the central axis of the round dental blank are exerted. For this purpose, the holding ring has, both in its inner diameter on the middle limb of the C and also at the spacing between the inner surfaces of the side limbs, smaller dimensions than the round dental blank, i.e. at the circumference of the round dental blank and at the level of the round dental blank.

The respective difference in spacing can be e.g. 0.1 or 0.2 mm. The thickness or layer thickness of the softer component can be e.g. 0.5 to 1 mm or 0.1 to 1 mm, and preferably 0.2 to 0.5 mm. A lower layer thickness allows a lower hardness without any unwanted displacement of the softer material.

The softer component of the holding ring is compressed by these dimensions by the degree of difference between the dimensions of the round dental blank on the outside and of the holding ring on the inside and accordingly exerts forces both in the axis-parallel direction and also in the radial direction.

It is particularly preferable that a holding projection forming an undercut, in particular a dovetail profile or another form-fitting profile, is oversized with respect to a chuck of a milling machine, and the softer component can be compressed, at a holding projection forming the undercut, when being clamped into the chuck.

A non-positive and form-fitting connection is thereby ensured automatically.

While, in an advantageous embodiment, the holding ring is of a two-part construction from two parts with an L-shaped cross-section which are held in a clamped manner on each other, a one-piece construction is also possible.

In a further advantageous embodiment, the holding ring is provided with a vertical slot or a vertical gap. This can be provided in addition to the horizontal separation plane or instead of this.

This slot splits the holding ring at one point. The holding ring can therefore be splayed in order to insert the round blank more easily.

However, it is important that the harder component overlaps the softer one. "Overlaps" does not just mean a one-dimensional overlap, i.e. that the harder component extends radially outside the softer component, but two-dimensional overlap, i.e. that in at least two spatial directions, the harder component is spaced further from the round dental blank than the softer component.

It is therefore possible, to ensure mounting of the round dental blank on the round dental blank holding ring in accordance with the invention in such a way that the milling forces introduced, which can indeed also act in more than one spatial direction, are gently absorbed in at least two mutually different, and in particular mutually orthogonal, spatial directions.

"Overlaps" also means mounting and support in at least two spatial directions, preferably in this case so that fixing takes place in both spatial directions, i.e. contact on both sides is ensured.

In accordance with the invention it is particularly favourable if a surface of the holding ring, which faces in one spatial direction, i.e. for example the radially inwardly facing surface of the holding ring, or the inner surface of an end limb of the holding ring, borders a further surface which extends at a right angle to this surface and is likewise provided with the softer component. Therefore, it is ensured that two-dimensional soft mounting is achieved.

Preferably, both the inner surface of the middle limb of the C of the holding ring and also the inner surfaces of the end limbs of the C of the holding ring are provided with the softer component.

In a further advantageous embodiment, provision is made for forming the holding ring with an L-shaped profile. A form-fitting profile for mounting in the milling holder is, in this embodiment, formed as a unitary construction radially on the outside as one piece with the vertical, longer limb of the L.

The shorter limb of the L extends radially inwardly, corresponding to the lower end limb of a C-shaped profile.

The round dental blank can be placed in the holding ring which also serves as a mounting aid. The lower limb serves as a stop and mounting aid for the round dental blank. A groove is preferably provided at the inner corner at the transition between the two limbs of the L and serves as an edge protection for a ceramic round blank.

The vertical limb of the L projects over the round dental blank preferably by a small amount. At this point a cover can also be articulated.

The L-shaped profile is preferably lined with the softer component on the inside. The softer component can also be provided only in partial regions in this case, which are mutually spaced apart when seen in the circumferential direction.

In accordance with the invention provision is made for the holding ring to consist of two different components which have different material properties. The "inner" component is softer and the "outer" component is harder.

Production is preferably carried out in such a way that both components are produced together in order to form the holding ring in the multi-component injection moulding process which is known per se.

It is not impossible that, instead of the two components mentioned herein, further components can also be used. For example, a third, even softer component can be applied as an additional layer to the softer component, the third, even softer component having a Shore hardness less than the Shore hardness of the soft component discussed below.

The soft component is more flexible than the hard component and the hard component has a higher hardness on the durometer scale than the soft component. The soft component may have a "soft," "medium soft," or "medium hard" durometer scale value as measured on the Shore Hardness Scale. The hard component may have a durometer scale value that is "medium hard", "hard" or "extra hard" on the Shore Hardness Scale.

Examples, include, but not limited to materials for the soft component are a synthetic material with rubber-elastic properties, such as a thermoplastic elastomer, in particular one with a Shore A hardness in the range of 30 to 70. The soft material may be a material in the hardness range of 12 Shore-A to 80 Shore-D, and preferably between 16 Shore-A and 50 Shore-A. Further examples include, but are not limited to, styrene-ethylene-butylene-styrene (SEBS), or, e.g. a foamed polyurethane rigid foam (PUR) with a hardness between 20 Shore-A and 40 Shore-A.

Examples, include, but not limited to materials for the hard component are a material with a hardness of more than 50 Shore-D and more preferably of more than 80 Shore-D, or even 90 Shore-D or more. Examples include, but are not limited to, acrylonitrile butadiene styrene (ABS), polymethyl methacrylate (PMMA), polyamide or commonly called nylon (PA) or the like. Ranges include 50-80, 50-90 or 50-100 or more Shore-D.

The soft and hard components may also be referred to herein as two components having different hardness values, one of the two components has a first hardness value and one of the two components has a second hardness value, the first hardness value is higher than the second hardness value. The hard component refers to the component with the first hardness value that is higher than the hardness of the second hardness value, i.e., the soft component.

A further particularly favourable consideration is that, by means of the softer component of the holding ring in accordance with the invention, manufacturing tolerances of round dental blanks of different origins can also be compensated for.

It is particularly favourable that no dental adhesive is required to fasten the holding ring to the round dental blank. This makes the solution in accordance with the invention resistant to aging.

In a further advantageous embodiment, provision is made for the components to be partially melted by means of a laser welding process during assembly in order to be connected to the round dental blank.

This permits an integral bond between a round dental blank, which can be fabricated of e.g. of PMMA, ceramics, cobalt chromium or even of a wax, and the holding ring.

In a further advantageous embodiment, provision is made for a cover for the round dental blank to be articulated on the holding ring and to extend over the exposed disc surface of the round dental blank. The cover can be connected to the holding ring by a film hinge and can also cover the whole upper side of the round dental blank.

The cover can also be provided in the same way on the lower side of the round dental blank so that the two covers together with the holding ring form a package for the round dental blank.

The cover can also be designed in such a way that a region of the transition between the cover and the holding ring is formed as a hinge, while the remaining region can be split so that the cover can be unfolded at the hinge formed in this way.

In a further particularly advantageous embodiment, provision is made for the holding ring to have a separation plane at which it can be split. The separation plane extends horizontally, i.e. approximately centrally through the round dental blank.

The upper end limb of the holding ring therefore overlaps the upper side of the round dental blank, and the lower end limb overlaps the lower side of the round dental blank. The middle limb is divided in this respect.

The softer component is still preferably provided on all inwardly facing parts of the holding ring so that soft mounting of the round dental blank on the holding ring is also possible in this embodiment.

In a further advantageous embodiment, a form-fitting profile, in particular a dovetail profile, is provided radially outwardly on the holding ring. Such a profile, e.g. a dovetail profile, is particularly suitable for holding the round dental blank in a clamped manner together with the holding ring at a machine receiver, also called a milling holder, of a dental milling machine. The profile has an undercut.

When a two-part embodiment with a separation plane of the holding ring is provided, the exemplified dovetail profile is divided vertically by the separation plane.

This embodiment offers the particular advantage that by means of the "gripping" of the milling machine, the dovetail profile and therefore at the same time the two parts of the holding ring are pressed together. In this way, a vertical force is then exerted both from below and also from above onto the round dental blank via the end limb of the holding ring, which serves for clamping purposes.

In a further preferred embodiment, provision is made for the soft component not to be a circular ring but to extend only over sections of the inside of the holding ring. This is sufficient for the desired mounting in a way that reduces stress peaks. In this way, it is possible to save material and weight.

According to a further aspect of the invention, provision is made for the round dental blank holding ring and the round dental blank to be formed in such a way that the cross-section of a receiving region of the holding ring forms a C-shaped profile with end limbs facing towards each other.

According to a second aspect of the invention, it is preferred if one end limb of the C forms a reference surface and another end limb of the C—together with the one end limb—forms a clamping device by means of which the region of the round dental blank can be clamped so as to be held for milling in a form-fitting manner in at least two spatial directions and in particular so as to be able to loaded by up to 100 N.

According to a further aspect of the invention, it is preferred if the unit formed by the round dental blank holding ring and the round dental blank bears a label, in particular with a QR code, or a chip, in particular an RFID chip, which has calibration information regarding the round dental blank and the unit.

It is preferable that a round dental blank holding ring is provided having at least two components having different hardness values, one of the at least two components has a first hardness value and one of the at least two components has a second hardness value, the first hardness value is higher than the second hardness value, wherein the first hardness value component overlaps the second hardness value component.

It is preferred that a radially inwardly facing surface of the holding ring is formed by and on the second hardness value component, wherein the holding ring has a substantially C shaped or L shaped cross-section and, wherein on an upper side and on a lower side of the holding ring, each upper and lower side comprises an end limb of the C shaped or L shaped cross-section or a radially inwardly projecting, end limb of the C shaped or L shaped cross-section.

It is preferred that an upper-side end limb of the holding ring includes, on a lower side, the second hardness value component, the second hardness value component comprising a thermoplastic elastomer, and/or a lower-side end limb of the holding ring, on an upper side, comprises the second hardness value component.

It is preferred that the holding ring, in a section extending in a radial direction, forms a C or an L, an upper end limb and/or lower end limb of which extend radially inwardly and a middle limb of which extends substantially vertically, and wherein the second hardness value component extends as a layer along the C or the L, on the radially inwardly facing, or inner, side.

It is preferred that the holding ring includes a horizontally extending, vertically dividing separation plane at which an upper part of the holding ring is configured for separation from a lower part of the holding ring and/or wherein the parts include the second hardness value component on a side facing the separation plane.

It is preferred that the holding ring includes a vertically extending gap or a slit interrupting the holding ring at the gap or slit, such that the holding ring is adapted for splaying in order to mount the round dental blank.

It is preferred that the holding ring includes a holding projection radially on the outside, which forms a form-fitting profile or structure at least partially circumferentially, having an undercut, and/or wherein the separation plane through the undercut of the form-fitting profile, extends dividing into two parts, viewed vertically.

It is preferred that the second hardness value component extends only over portions of an inner circumference of the holding ring at a plurality of regions uniformly distributed over the inner circumference and/or wherein the second hardness value component extends annularly on the inner circumference of the holding ring. One example of a plurality of regions may include 3 to 20 regions.

It is preferred that the second hardness value component is connected in a form-fittingly and/or integrally bonded to the round dental blank, and/or wherein the second hardness value component is connected to the first hardness value component by a multi-component injection moulding process, or one of the at least two components is provided as an insert part in an injection mould and the holding ring is produced by injection on the insert part or around the insert part. Integrally bonded may include laser welded.

It is preferred that a cover extends radially inwardly of an upper-side end limb of the holding ring and/or radially inwardly of a lower-side end limb of the holding ring, the cover covering the inner space of the holding ring on an upper side, and/or wherein the cover is connected by an integrally bond to the holding ring, to the second hardness value component thereof, and the connecting line forms a desired breaking point, and/or wherein the cover is provided with a tear-off strip.

It is preferred that the second hardness value component extends, apart from chamfers of the second hardness value component, with a substantially uniform layer thickness, and/or wherein the second hardness value component comprises a synthetic material with a Shore A hardness of less than 80.

It is preferred that an arrangement is provided including a round dental blank holding ring and round dental blank, wherein the holding ring comprises a receiving region for the round dental blank substantially in the form of a round disc, wherein the receiving region is circular or in the form of part of a circle, and wherein a region of the round dental blank comprises a free edge at an edge of the round blank which is configured to be supported on the receiving region, wherein the holding ring comprises at least two components comprising a component with a first hardness value and a component with a second hardness value.

It is preferred that the receiving region includes a C shaped profile (44) or an L shaped profile, an inner side of which C shaped or L shaped profile faces the round blank, on which inner side the round dental blank is configured for mounting and fixing to the holding ring.

It is preferred that the holding ring comprises a horizontally extending, vertically dividing separation plane at which an upper part of the holding ring can be separated from a lower part of the holding ring.

BRIEF DESCRIPTION OF THE DRAWINGS

Further advantages, details and features will be apparent from the following description of several exemplified embodiments of the invention with reference to the drawing.

In the drawings.

DETAILED DESCRIPTION

Figure 1:
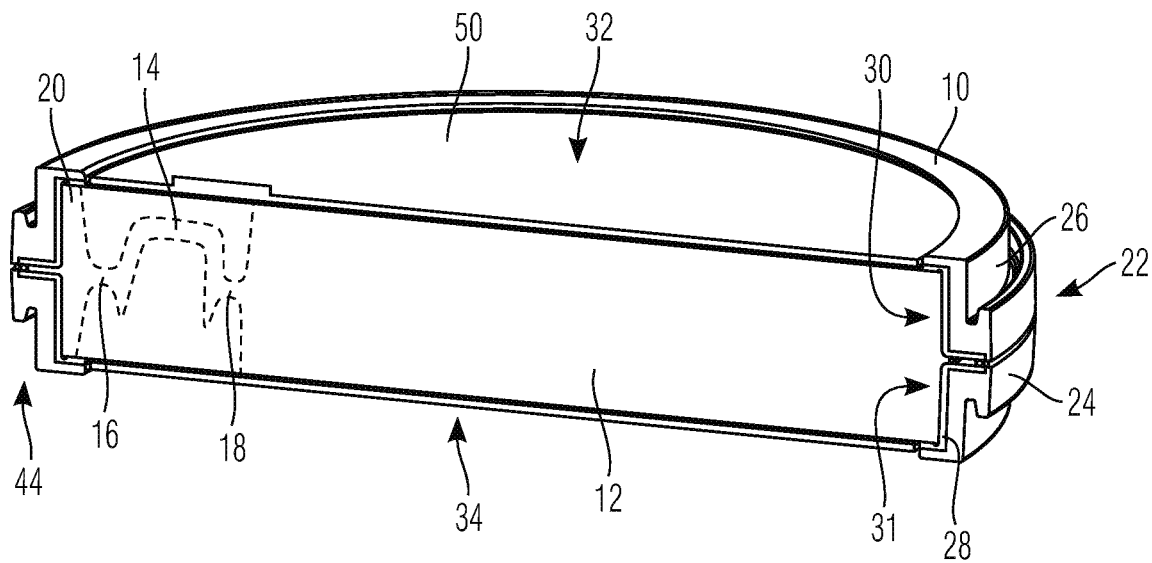
FIG. 1 is a schematic perspective sectional view of an embodiment of a round dental blank in accordance with the invention with the integrated round dental blank holding ring.

According to FIG. 1, a round dental blank holding ring 10 in the shape of a circular ring is attached to a round dental blank 12. In the illustrated exemplified embodiment, the round dental blank 12 includes a dental ceramic and is intended to be a blank for a dental restoration part 14 or a plurality of dental restoration parts.

The dental restoration parts are milled in a manner which is known per se from the round dental blank 12.

Such a dental restoration part 14 is indicated by a broken line in FIG. 1. The dental restoration part 14 is connected, also in a manner which is known per se, to the milled round dental blank 12 via holding webs 16 and 18. The holding webs 16 and 18 permit milling of the dental restoration part 14.

After completion of the milling process and possibly after a polishing process, the dental restoration part 14 is broken out of the round dental blank 12 in a manner which is known per se.

Towards the dental restoration part holding ring 10 there is a free edge 20, the size and thickness of which are material-dependent. The free edge 20 produces the connection to the round dental blank holding ring 10 which for its part is clamped in a milling holder. The milling holder is not illustrated and can be e.g. in the form of a circular ring so that the round dental blank holding ring 10 fits precisely into the milling holder.

For mounting purposes, the round dental blank holding ring 10 comprises a holding projection 22 which, in the case of the example, is formed as a dovetail profile 24 and therefore acts as a form-fitting profile with a milling holder.

In accordance with the invention, provision is made for the holding ring 10 to include two components, specifically a harder component 26 and a softer component 28. The harder component 26 forms, so to speak, the "spine" of the holding ring 10.

The holding ring 10 has a C-shaped cross-section. On its inner side 30 it is provided with the softer component 28. On this side, the softer component 28 is, in the illustrated exemplified embodiment, formed circumferentially as a uniform layer. Accordingly, it lies both on the upper side 32 of the round dental blank 12 and also on the lower side 34 of the round dental blank 12, and in particular adjacent to the circumference of the round dental blank 12, specifically on the outer part of the free edge 20.

In this respect, the holding ring 10 forms a receiving region 31 on its inner side 30. This serves to receive and securely mount the round dental blank 12. With its receiving region 31, the holding ring 10 overlaps the round blank and mounts it and supports it against milling forces in a plurality of spatial directions, specifically in 4 horizontal and 2 vertical directions.

Furthermore, the softer component 28 lies on the full surface of the circumference of the round dental blank 12. The round dental blank 12 is a flat cylindrical disc. By the cooperation of the harder component 26 and the softer component 28 with a slight oversize of the round dental blank 12 with respect to the holding ring 10, the round dental blank 12 is mounted in the holding ring 10 in a clamped manner without play.

Figure 2:
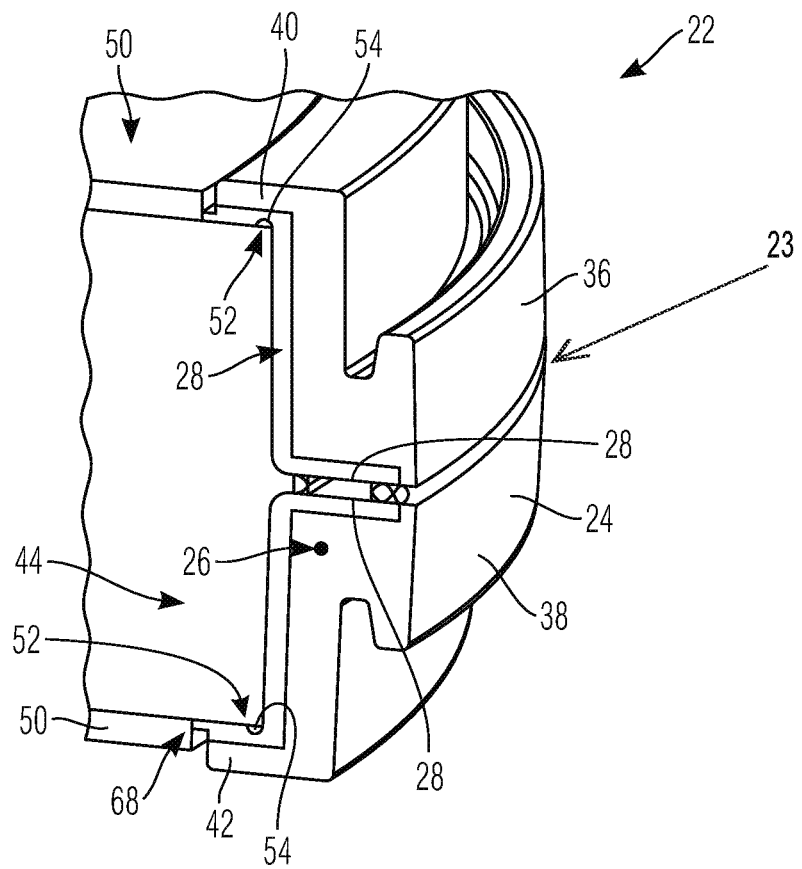
FIG. 2 is an enlarged section of FIG. 1.

FIG. 2 shows an enlarged view of a part of the mounting according to FIG. 1. The holding ring 10 is formed in two parts and includes an upper part 36 and a lower part 38. The softer component 28 also extends between the upper part 36 and the lower part 38.

The holding projection 22 is overlapped by the milling holder. This is formed in such a way that it can, at this point, press the two halves of the dovetail profile 24 towards each other. In this way, the softer component 28 is compressed between the two parts 36 and 38. At the same time, a pressing force is exerted at the end limbs 40 and 42 of the C-shaped profile 44 of the holding ring 10, and by the movement of the end limbs 40 and 42 towards each other, the softer component 28 is compressed at this point so that the holding force with respect to the round dental blank 12 is improved. The holding ring comprises a horizontally extending, vertically dividing separation plane 23 at which an upper part of the holding ring can be separated from a lower part of the holding ring.

In the illustrated exemplified embodiment, the holding ring 10 comprises a cover 50. The cover 50 is provided both on the upper side 32 and also on the lower side 34 and extends over the round dental blank 12. In this way, a package for the round dental blank 12 is simultaneously provided to protect against damage.

For the remainder, the cover 50 is connected to the holding ring 10 via the softer component 28.

The inner corners 52 of the C-shaped profile 44 have a groove 54. This serves to protect the sensitive corners of the round dental blank 12 consisting of ceramic. When only one groove 54 is provided as edge protection at the breaking edge of a ceramic round dental blank, it is preferable to produce this at the bottom, i.e. facing away from the primary side on which the milling tool is applied.

Figure 3:
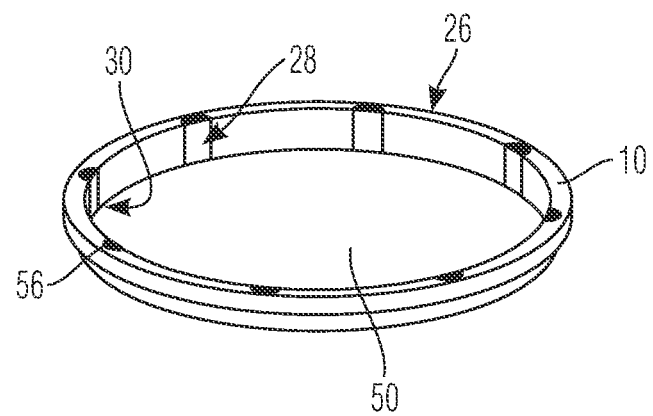
FIG. 3 is a schematic view of a further embodiment of a round dental blank holding ring in accordance with the invention.

FIG. 3 shows a further embodiment of a round dental blank holding ring 10 in accordance with the invention.

According to the perspective view, the holding ring 10 includes the harder component 26 and the softer component 28. In this embodiment, however, the softer component 28 is not produced as a circumferential layer but merely in regions, in the illustrated embodiment 8 regions 56 distributed around, which also serve to support the round dental blank 12.

The holding ring 10 serves as a mounting aid in this case, wherein the round blank is inserted into the holding ring 10 in conjunction with the softer component in order to achieve precise positioning, or can be positioned using the relevant regions of the holding ring as a stop.

Figure 4:
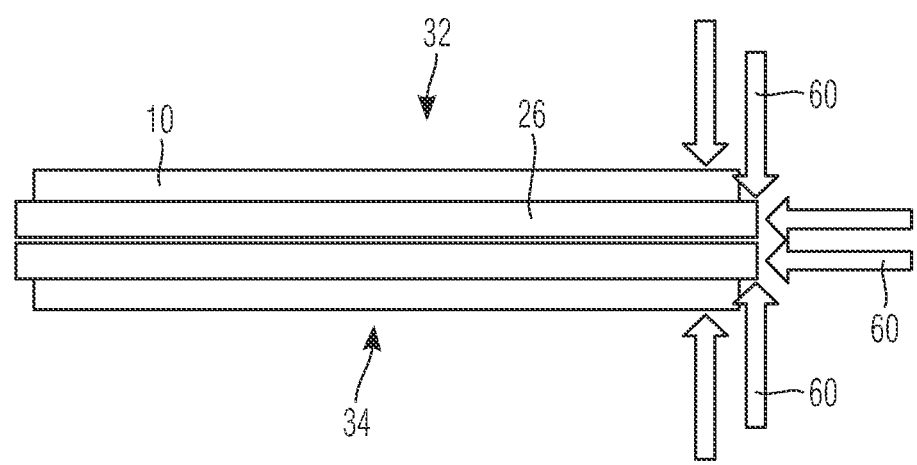
FIG. 4 is a schematic view of a further embodiment of the round dental blank in accordance with the invention with the round dental blank holding ring, showing the production principle.

FIG. 4 shows the exemplified manner in which the round dental blank holding ring 10 in accordance with the invention can be connected to the round dental blank 12. In the illustrated exemplified embodiment, the harder component 26 of the holding ring 10 is permeable to laser radiation 60 of a preset wavelength of e.g. 1500 nm. The softer component 28, which is not shown in FIG. 4, is absorbent thereto at this wavelength.

Alternatively it is possible to use ultrasound welding in order to produce the connection between the holding ring 10 and the round dental blank 12.

Laser radiation 60 is applied both in the axis-parallel direction from the upper side 32 and also from the lower side 34 as well as radially inwards. The laser radiation 60 melts the softer component 28 or at least starts to melt it. The round dental blank 12 is then additionally also mounted in an integrally bonded manner in the holding ring 10.

However, it is also possible for mere non-positive and form-fitting mounting of the round dental blank 12 in the holding ring 10 according to the embodiments of FIGS. 1 to 3 to suffice.

Figure 5:
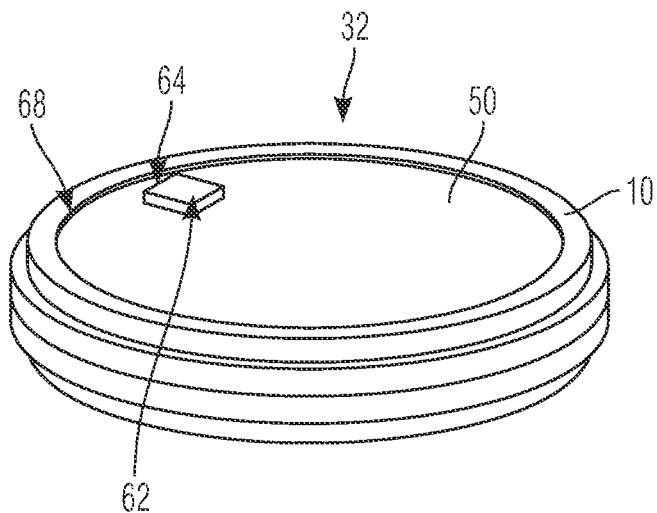
FIG. 5 is a perspective view of the embodiment of the round dental blank in accordance with the invention with the round dental blank holding ring according to FIG. 1, showing the round dental blank holding ring with a cover.

FIG. 5 shows the manner in which the cover 50 can extend over the upper side 32 of the round dental blank 12. In the illustrated exemplified embodiment, the cover 50 has a tear-off strip 62 which for its part can unfold and is for this purpose connected to the cover 50 via a film hinge 64.

When the tear-off strip 62 is pulled, the cover 50 separates from the holding ring 10 at the transition via the softer component 28 which is thin at that location. In this respect, this transition forms a desired breaking point 68 which permits easy removal of the cover 50.

The softer component 28 preferably is fabricated of a thermoplastic elastomer or other rubber-like synthetic material and has a Shore A hardness between 40 and 60.

Figure 6:
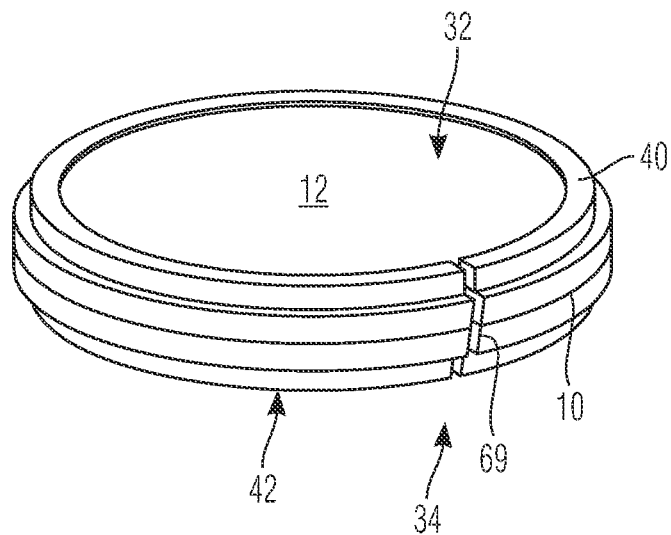
FIG. 6 is a perspective view of a further embodiment of the round dental blank in accordance with the invention with the round dental blank holding ring, using a round dental blank holding ring without a cover.

FIG. 6 shows the manner in which the round dental blank 12 with the holding ring 10 appears in the state ready for milling. The upper side 32 is freely accessible but the round dental blank 12 is surrounded at least in a non-positive manner and a form-fitting manner by the holding ring 10.

In the embodiment of FIG. 4, an integrally bonded connection is also provided.

The harder component 26 is softer than ceramic and therefore softer than the round dental blank 12. Therefore, the end limbs 40 and 42 of the holding ring 10 can also readily be partially milled away.

Both the softer component 28 and also the harder component 26 preferably consist of a millable material.

The holding ring 10 in accordance with the invention ensures extremely good mounting of the round dental blank 12 even when the holding ring 10 has been partially milled away. The remaining parts of the end limbs 40 and 42, i.e. those not milled away, still ensure sufficient mounting in the vertical direction, the so-called Z direction.

Since the holding ring 10 also holds the round dental blank 12 in the axial direction, the round dental blank 12 is placed under pressure axially.

Ceramic is known to be substantially more resistant to pressure than it is to tension and so by this additional stress, the free edge 20 can be selected to be smaller than in the solutions known thus far.

In accordance with the invention it is particularly useful that an integrated package can therefore be produced. The mounting and handling of the round dental blank 12 on the milling holder, as well as other actions, are simpler and safer since the round dental blank holding ring 10 in accordance with the invention simultaneously forms an edge protection for the sensitive ceramic round dental blank 12.

Furthermore, a certain compensation for tolerances is also possible because the production of the layer from the softer component 28 also permits safe reception in the presence of production tolerances.

All in all, the materials to be machined can be used better, which also leads to a time saving for the end user. Owing to the fact that it is possible to mill into the holding ring 10, a larger nesting region can be produced in the case of the arrangement of dental restorations 14 in the round dental blank 12 forming the blank.

Furthermore, FIG. 6 shows a slot 69 or a gap extending vertically. At this point the holding ring 10 can be splayed to some degree e.g. by 20% of its diameter. This splaying is sufficient to insert the round dental blank 12 into the holding ring 10. After release, the holding ring 10 returns to the almost closed position shown in FIG. 6.

Figure 7:
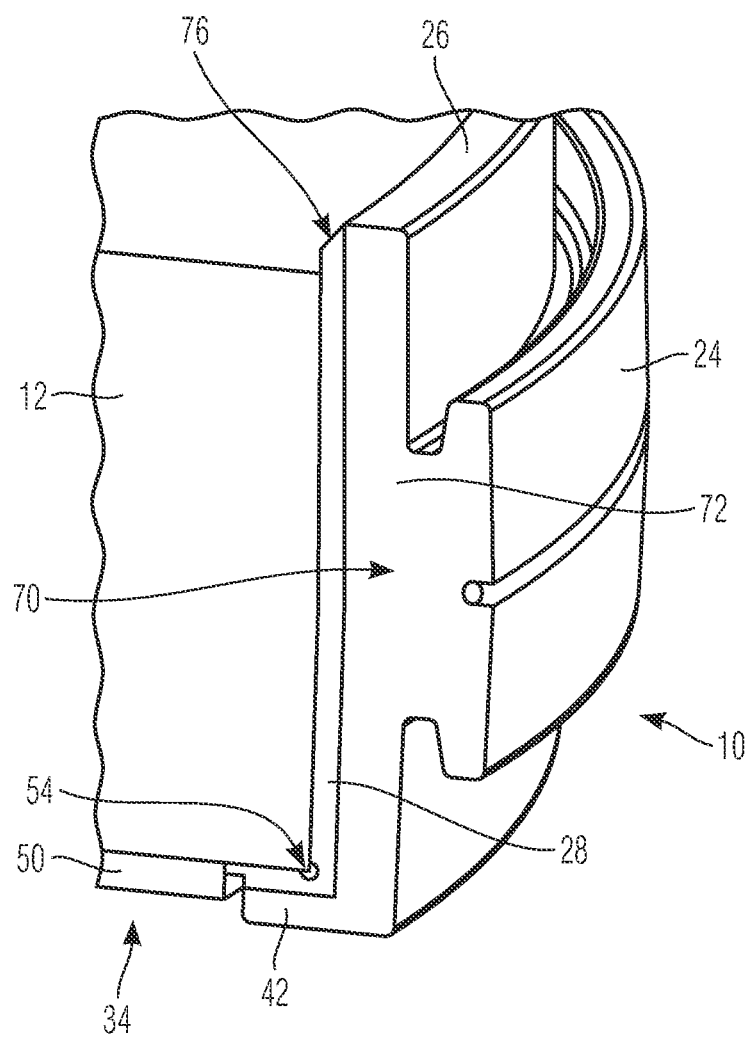
FIG. 7 is a schematic perspective sectional view of an embodiment of a round dental blank in accordance with the invention with the integrated round dental blank holding ring.

FIG. 7 shows a further embodiment of the invention with an L-shaped profile 70 of the holding ring 10. The profile 70 consists of a vertical limb 72 on which the form-fitting profile 24 is formed as a unitary construction in the radially outward direction, and of a horizontal limb issuing therefrom at the bottom, extending radially inwardly and corresponding to the lower end limb 42 of a C-shaped profile.

At the transition between these limbs 72 and 42, a groove 54 is provided on the inside which fully leaves clear a breaking edge of an inserted ceramic round dental blank 10.

The L-shaped profile 72 consisting of the harder component 26 is fully lined on the inside with the softer component 28.

Since the L-shaped profile 72 is open at the top it is possible to insert the round dental blank 12 into the holding ring 10 from there. In order to facilitate insertion, the inner, softer component 26 has an insertion slope 76. Furthermore, the holding ring 10 extends upwardly beyond the round dental blank 12 and so it is received therein in a safely protected manner.

Figure 8:
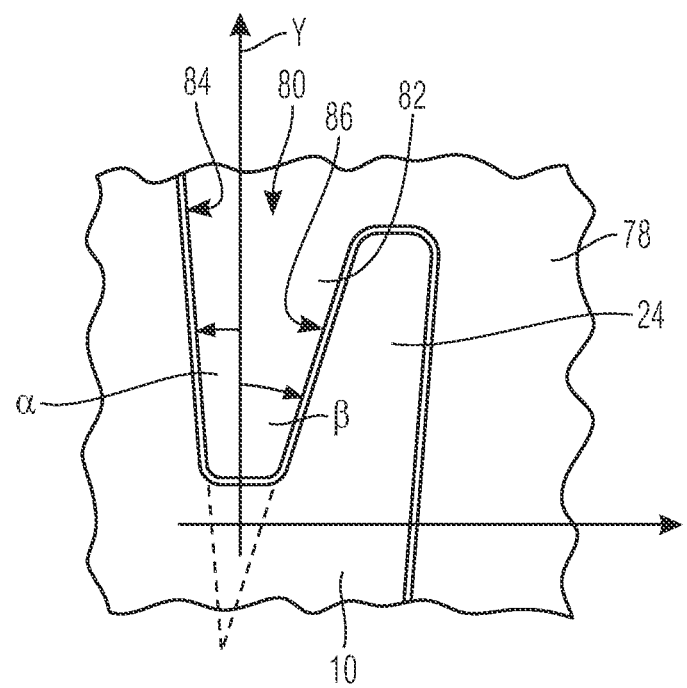
FIG. 8 is a schematic sectional view to clarify a modification of the embodiment according to FIG. 2 or according to FIG. 7 to illustrate the form-fitting profile.

FIG. 8 shows a sectional view of a round dental blank holding ring 10 which is engaged with a partially illustrated milling holder 78. The mounting of the holding ring 10 in the milling holder 78 is effected via a form-fitting profile, a dovetail profile 24 in the illustrated exemplified embodiment.

The following explanations also serve to clarify that numerous desired embodiments of a form-fitting profile are possible without departing from the scope of the invention.

In a manner which is known per se, the form-fitting profile has a groove 80 into which a web 82 of the milling holder 78 engages.

FIG. 8 shows the upper part of the dovetail profile 24 and of the milling holder 78 and it is understood that the lower part has mirror symmetry to this.

The groove 80 has a groove flank 84 on the round blank side and a groove flank 86 on the milling holder side.

Furthermore, a movement axis Y of the milling holder 78 is indicated in FIG. 8, along which the two milling holder halves, i.e. the upper one illustrated in this case and the lower one, can travel.

In the illustrated exemplified embodiment, the movement axis Y is parallel to the axis of the round blank 12 and therefore perpendicular to the extension of the holding ring 10. It will be understood that it is even possible to incline the movement axis Y with respect to this perpendicular without departing from the scope of the invention.

As shown in FIG. 8, there is an angle $\alpha$ between the axis Y and the groove flank 84 on the round blank side and an angle $\beta$ between the axis Y and opposite the groove flank 86 on the milling holder side.

This angle can be adapted in wide ranges to suit the requirements. The angle $\alpha$ can be e.g. 1° to 8° and is 5° in the case of the example.

In contrast, the angle $\beta$ is preferably greater, specifically between 1° and 45°, preferably between 5° and 20° and in the illustrated exemplified embodiment is 15°.

Larger angles have the advantage that tolerances can be accommodated better while smaller angles lead to better fixing with lower holding forces.

In this case, an adaptation to the requirements can be made within wide ranges.

Figure 9:
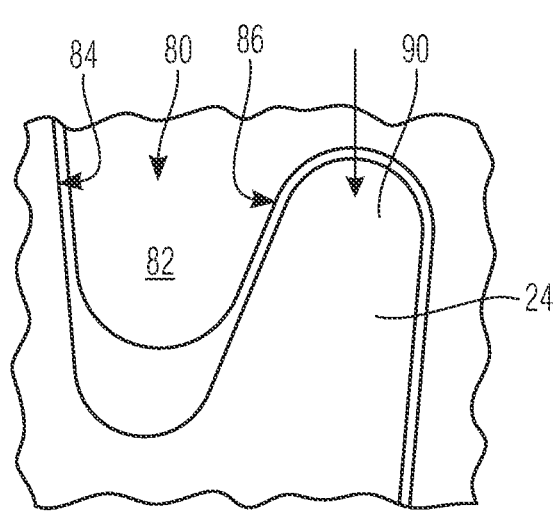
FIG. 9 is a further modification of the illustration according to FIG. 8.

According to FIG. 8, the web 82 extends into the groove 80 in such a way that the groove is completely or almost completely filled. However, this is not necessarily required, as shown, inter alia, by FIGS. 9 and 10 and the fundamental considerations. Since the dovetail profile 24 likewise extends with an upper part and a lower part, and the two parts of the milling holder 78 are moved towards each other in order to provide a form-fit, the vertical setting of height is achieved by the contact at the end 90 of the dovetail profile 24 via the horizontal surface at that location.

For the transmission of the milling forces it is important to provide support against moments which act around the contact point or contact line, the two-part design of the milling holder 78 and therefore of the form-fitting profile, and the long load arm thus produced, lead to a favourable effect and only some of the forces must be captured in the upper part considered here.

For the absorption of moments, the large-surface contact between the web 82 and the groove flank 84 on the round blank side, but also the groove flank 86 on the milling holder side, is required. However, this does not have to be over the whole height of the groove 80 and so it is sufficient for the web 82 to extend into the groove 80 only in the upper part. The lever effect is best at this point.

Figure 10:
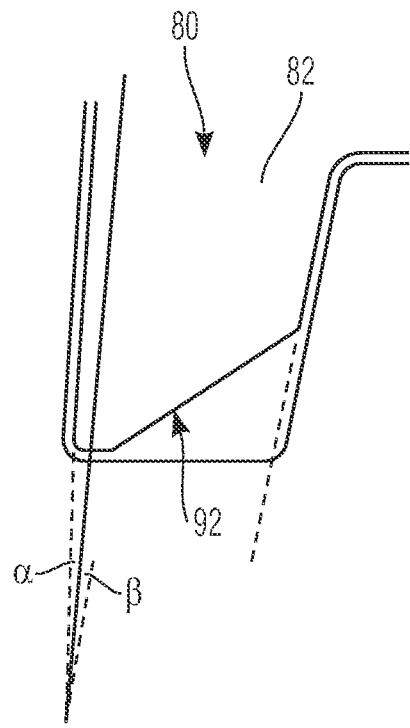
FIG. 10 is a further modification of the illustration according to FIGS. 8 and 9.

An embodiment modified with respect thereto is shown in FIG. 10. The web 82 also does not extend fully into the groove 80 in this case so as to fill it completely but rather an insertion slope 92 is formed at the lower/radially outer point of the web 82. In this exemplified embodiment, the angles α and β are, in addition, substantially smaller, specifically α=2° and β=4°.

Figure 11:
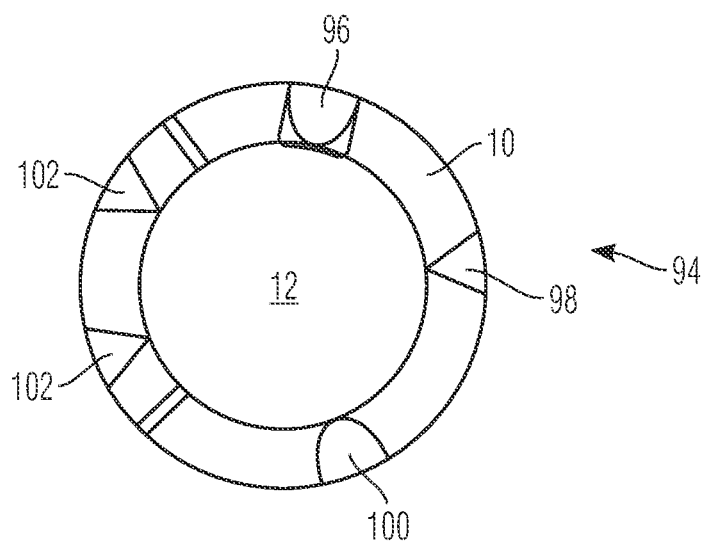
FIG. 11 is a modified illustration of a round dental blank holding ring with the provision of an alternative form-fitting profile.

FIG. 11 schematically illustrates a further embodiment in accordance with the invention of a round dental blank holding ring 10. In this embodiment, the holding ring is provided with form-fitting recesses 94 in regions. These can be distributed non-uniformly around the holding ring 10 and be the same as each other or can have forms which differ with respect to each other.

Merely by way of example, a cuboidal recess 96, a conical recess 98 and a semi-spherical recess 100 are illustrated in this case. Instead of the conical recess 98, a triangular recess can also be produced and other desired shapes are possible.

In the illustrated exemplified embodiment, the form-fitting profiles described herein extend through an angle of less than 360°, e.g. through 240°. They are intended to receive corresponding suitably shaped spigots of the milling holder 78.

The milling holder 78 can, with this solution, preferably be divided not in the horizontal direction but in the vertical direction. Furthermore, the region of the holding ring 10 on the left in the illustration of FIG. 11 is provided with recesses 102 which are intended for engagement with a changer of a workpiece magazine.

In order for the machined round dental blank 12 to be changed, a changer suitable for this purpose grasps the holding ring 10 at the recesses 102, and the milling holder 78 releases the round dental blank 12 with the holding ring 10 in machined form. The changer removes the round blank 12 from the milling region and presents a new round blank 12 which is to be machined to the milling holder 78.

In the illustrated exemplified embodiment, the gripping region of the changer extends through clearly less than 180°, e.g. through 120°.

Figure 12:
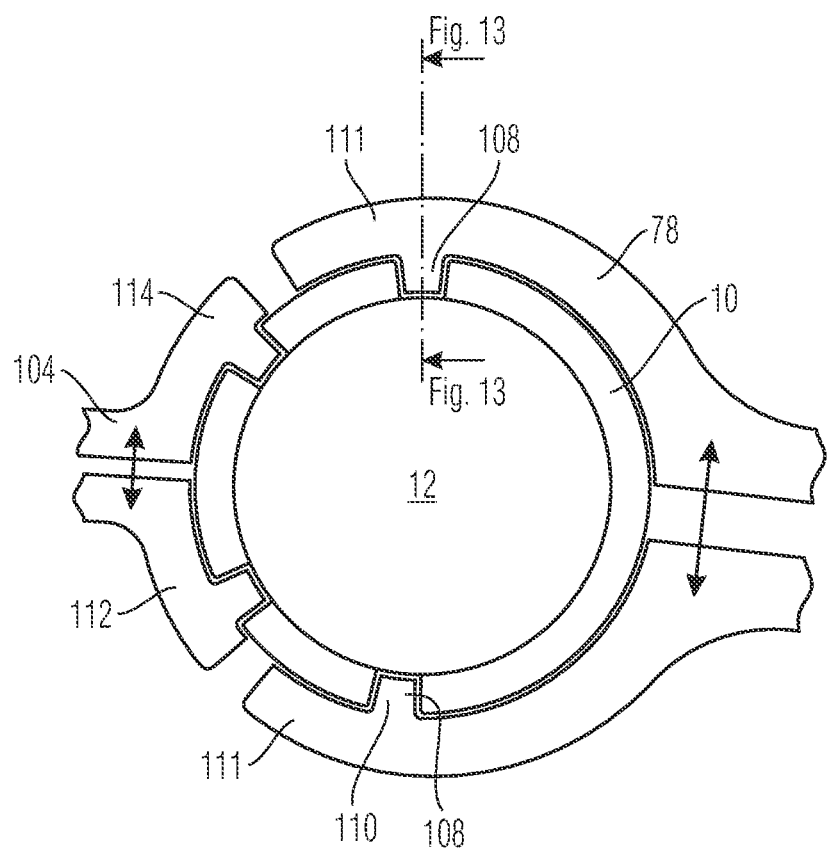
FIG. 12 is a schematic selective illustration of an embodiment of a milling holder, of the round dental blank holding ring and of a round dental blank changer.

A further embodiment of such a milling holder 78 in cooperation with a changer 104 is shown in FIG. 12. In that case, two trapezoidal recesses 108 are provided at different and mutually asymmetrical angular positions of the holding ring 10. Corresponding spigots 110 of the milling holder 78 engage therein.

As shown, the milling holder 78 in this case is also divided with a vertical separation plane. Both tines 111 of the milling holder 78 overlap the round dental blank 12 with its holding ring 10 by about 230°, and the changer 104, which also has two tines 112 and 114 with a vertical separation plane, has a wrap angle of about 120° with respect to the holding ring 10.

Figure 13:
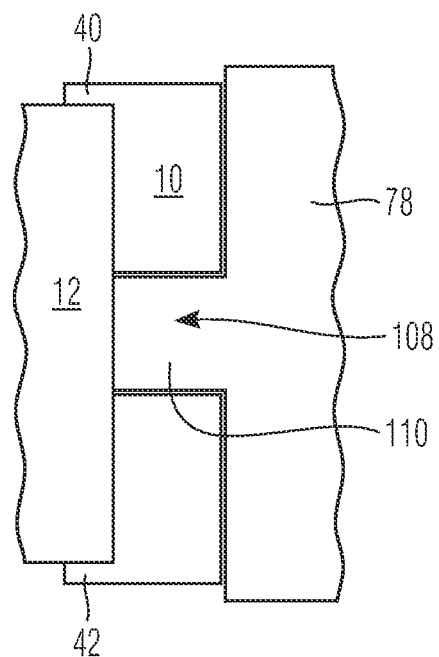
FIG. 13 is a sectional view of the embodiment according to FIG. 12.

A section through a detail of FIG. 12 is shown in FIG. 13. As shown, the recess 108 extends merely over the middle part of the height of the holding ring 10. The spigot 110 fills this recess. Therefore, the desired form-fit is ensured.

As shown, the holding ring 10 is also C-shaped in cross-section in this embodiment and so it overlaps the round blank 12 with its end limbs 40 and 42.

Figure 14:
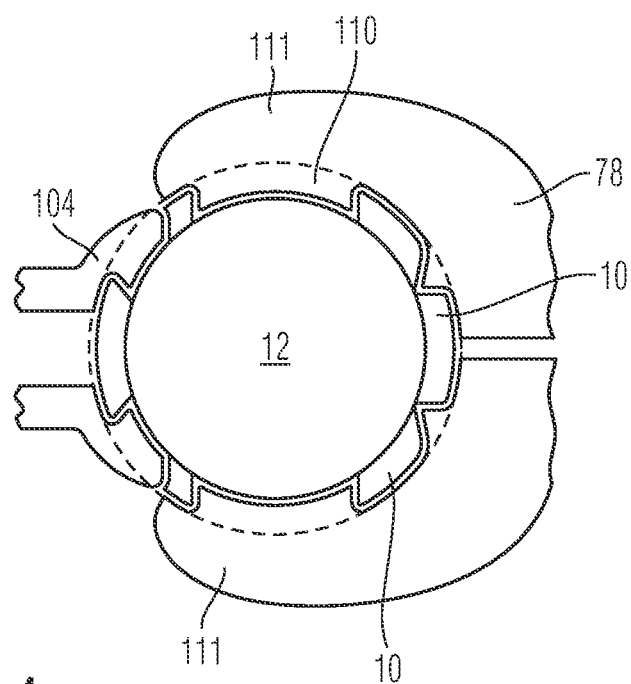
FIG. 14 is a modified embodiment of the illustration according to FIG. 12.

A further embodiment of a round dental blank holding ring 10 in accordance with the invention with an associated milling holder 78 is shown in FIG. 14. The same reference numerals in this and also in the other figures refer to the same parts, and this holding ring 10 is also intended for the production of a changer 104 for a milling machine with a workpiece magazine.

It will be understood that the operation of the changer 104 and/or of the milling machine holder 78 with respect to the mounting of the round blank 12 by means of the holding ring 10 thereon can take place in any suitable manner. A form-fit is preferred at least in the case of the milling holder 78, but a non-positive connection—in particular in the case of the changer—is also possible.

The terms "about" and "substantially" are intended to include the degree of error or uncertainty associated with measurement of the particular quantity or shape as one of ordinary skill in the art would understand.

The invention claimed is:

1. A round dental blank holding ring (10) comprising
at least two components (26, 28) having different hardness values, one of the at least two components comprises a first hardness value and a second of the at least two components comprises a second hardness value, the first hardness value is higher than the second hardness value;
wherein the component with the first hardness value overlaps the component with the second hardness value;
wherein the holding ring (10) comprises: a horizontally extending, vertically dividing separation plane at which an upper part (36) of the holding ring (10) is configured for separation from a lower part (38) of the holding ring (10).

2. The holding ring as claimed in claim 1,
wherein a radially inwardly facing surface of the holding ring (10) is formed by and on the second hardness value component (28).

3. The holding ring (10) as claimed in claim 1,
wherein the holding ring (10) has a C-shaped or L-shaped cross-section.

4. The holding ring (10) as claimed in claim 1,
wherein an upper-side end limb (40) of the holding ring (10) comprises, on a lower side, the second hardness value component (28); and/or
wherein a lower-side end limb (42) of the holding ring (10), on an upper side, comprises the second hardness value component (28).

5. The arrangement as claimed in claim 4,
wherein the second hardness value component comprises a thermoplastic elastomer.

6. The holding ring (10) as claimed in claim 1, wherein the holding ring (10), in a section extending in a radial direction, forms a C or an L, an upper end limb (40) and/or lower end limb (42) of which extend radially inwardly, and a middle limb of which extends substantially vertically; and wherein the second hardness value component (28) extends as a layer along the C or the L, on a radially inwardly facing side or an inner side.

7. The holding ring (10) as claimed in claim 1,
wherein the holding ring (10) comprises a vertically extending gap or a slit (69) interrupting the holding ring at the gap or the slit, such that the holding ring (10) is adapted for splaying in order to mount a round dental blank (12).

8. The holding ring (10) as claimed in in claim 1,
wherein the holding ring (10) comprises a holding projection radially on an outside, which forms a form-fitting profile or structure at least partially circumferentially, having an undercut (22); and/or
wherein the separation plane through the undercut (22) of the form-fitting profile (24), extends dividing into two parts, viewed vertically.

9. The holding ring (10) as claimed in in claim 1,
wherein the second hardness value component (28) is connected form-fittingly and/or is integrally bonded to a round dental blank (12); and/or
wherein the second hardness value component (28) is connected to the first hardness value component (26) by a multi-component injection moulding process, or one of the at least two components (26, 28) is provided as an insert part in an injection mould and the holding ring (10) is produced by injection on the insert part or around the insert part.

10. The holding ring (10) as claimed in in claim 9,
wherein integrally bonded comprises laser welded.

11. The holding ring (10) as claimed in in claim 1,
wherein a cover (50) extends radially inwardly from an upper-side end limb (40) of the holding ring (10) and/or radially inwardly from a lower-side end limb (42) of the holding ring (10), the cover (50) covering an inner space of the holding ring (10) on an upper side (32);
wherein the cover (50) is integrally bonded to the holding ring (10) and to the second hardness value component (28) thereof, and at where the cover is connected forms a desired breaking point (68).

12. The holding ring (10) as claimed in in claim 11,
wherein the cover (50) is provided with a tear-off strip (62).

13. The holding ring (10) as claimed in in claim 1,
wherein the second hardness value component (28) extends with a substantially uniform layer thickness; and
wherein the second hardness value component (28) comprises a synthetic material with a Shore A hardness of less than 80.

14. An arrangement comprising
a round dental blank holding ring (10) and round dental blank;
wherein the holding ring (10) comprises a receiving region (31) for the round dental blank substantially in the form of a round disc;
wherein the receiving region (31) is circular or in the form of part of a circle, and
wherein a region of the round dental blank comprises a free edge (20) at an edge of the round blank which is configured to be supported on the receiving region (31);
wherein the holding ring (10) comprises: at least two components (26, 28) having different hardness values, one of the at least two components comprises a first hardness value and a second of the at least two components comprises a second hardness value, the first hardness value is higher than the second hardness value;
wherein the component with the first hardness value overlaps the component with the second hardness value;
wherein the holding ring (10) comprises: a horizontally extending, vertically dividing separation plane at which an upper part (36) of the holding ring (10) is configured for separation from a lower part (38) of the holding ring (10).

15. The arrangement as claimed in claim 14, wherein the receiving region (31) comprises a C-shaped profile (44) or an L-shaped profile, an inner side (30) of which the C-shaped or the L-shaped profile faces the round dental blank (12), on which an inner side of the round dental blank (12) is configured for mounting and fixing to the holding ring (10).

16. A round dental blank holding ring (10) comprising at least two components (26, 28) having different hardness values, one of the at least two components comprises a first hardness value and a second of the at least two components comprises a second hardness value, the first hardness value is higher than the second hardness value; wherein the component with the first hardness value overlaps the component with the second hardness value; wherein the holding ring (10) comprises: a horizontally extending, vertically dividing separation plane at which an upper part (36) of the holding ring (10) is configured for separation from a lower part (38) of the holding ring (10); and wherein an upper-side end limb (40) of the holding ring (10) comprises, on a lower side, the second hardness value component (28), and/or wherein a lower-side end limb (42) of the holding ring (10), on an upper side, comprises the second hardness value component (28).

* * * * *